United States Patent [19]

Brakefield et al.

[11] Patent Number: 6,047,006
[45] Date of Patent: Apr. 4, 2000

[54] METHOD AND APPARATUS FOR DYNAMICALLY ALLOCATING BANDWIDTH TO INDEPENDENT DATA AND AUDIO DEVICES

[75] Inventors: William A. Brakefield, Round Rock; Elie Antoun Jreij, Pflugerville; Vedat M. Bilgutay, Round Rock; Bruce E. Burnett, Austin; James S. Umstetter, Round Rock, all of Tex.

[73] Assignee: Siemens Information and Communication Networks, Inc., Boca Raton, Fla.

[21] Appl. No.: 08/864,869

[22] Filed: May 12, 1997

[51] Int. Cl.$^7$ .............................. H04L 12/66; H04J 3/12; H04M 11/00
[52] U.S. Cl. ...................... 370/524; 370/357; 379/93.09; 379/93.14
[58] Field of Search ..................................... 370/264, 522, 370/524, 357; 379/93.09, 93.14, 442

[56] References Cited

U.S. PATENT DOCUMENTS

| | | | |
|---|---|---|---|
| 4,970,723 | 11/1990 | Lin | 370/110.1 |
| 5,036,513 | 7/1991 | Greenblatt | 370/125 |
| 5,303,239 | 4/1994 | Aoki et al. | 370/410 |
| 5,475,691 | 12/1995 | Chapman et al. | 370/110.4 |
| 5,581,560 | 12/1996 | Shimada et al. | 370/527 |
| 5,841,840 | 11/1998 | Smith et al. | 379/93.09 |

*Primary Examiner*—Michael Horabik
*Assistant Examiner*—Kevin C. Harper

[57] ABSTRACT

A method and apparatus for utilizing a multi-channel digital communications line provides dynamic bandwidth allocation of user data channels for supporting a data device and an audio device, such as a digital telephone. In the preferred embodiment, the communications line is an ISDN line in which both B-channels are dedicated to data transfers for the data device when the audio device is idle. However, the signaling channel is continuously monitored to detect events in which incoming and outgoing voice calls are indicated. One of the B-channels is surrendered in order to allow connectivity of the voice call. Reallocation of the surrendered B-channel to the support of a data transfer occurs upon detection of a D-channel signal that indicates that the audio device has released the channel.

15 Claims, 5 Drawing Sheets

FIG_2

FIG_3

FIG_4

FIG_5

METHOD AND APPARATUS FOR DYNAMICALLY ALLOCATING BANDWIDTH TO INDEPENDENT DATA AND AUDIO DEVICES

BACKGROUND OF THE INVENTION

The invention relates generally to a method and apparatus for simultaneously supporting audio communications and data communications utilizing a single multi-channel communications link, and more particularly to dynamically allocating bandwidth between an audio device and a data device connected to the same digital communications line having a signaling channel and at least two user data channels.

DESCRIPTION OF THE RELATED ART

Within the telecommunications industry, digital transmissions offer advantages over transfers of analog signals. Digitizing voice information to a pattern of discrete values, e.g. ones and zeros, facilitates filtering a signal to remove the noise that is inadvertently added during the transmission of the signal from a sending site to a receiving site. Thus, the signal-to-noise ratio is typically greater for a digital telephone than it is for an analog telephone. Moreover, digital telephones often provide greater display capabilities and more advanced features, since digital communication lines offer increased bandwidth. For example, an Integrated Services Digital Network (ISDN) includes a signaling channel and at least two user data channels. The signaling channel is referred to as the D-channel and may have a capacity of 16 kbps or 64 kbps, depending upon the type of circuit that is utilized. The user data channels are also referred to as B-channels and conventionally have a capacity of 64 kbps. A Basic Rate Interface (BRI) consists of two B-channels and one D-channel.

In addition to supporting a digital telephone or other audio device, ISDN operates well for data transmissions to and from a data device, such as a personal computer. Maximum throughput for the data transmissions is achieved if both B-channels of the BRI are dedicated to the data device. The effective throughput is twice that which would be available if a single B-channel were dedicated to supporting the data device.

A concern is that there are applications in which an ISDN line is utilized to support both a data device and a digital telephone. If the data device is active and is receiving and sending data via both B-channels, the digital telephone will be blocked from access to the ISDN line for an outgoing or incoming call. One solution is to sacrifice data throughput by dedicating only one B-channel to the data device and dedicating the other B-channel to the telephone. This solution is identified in U.S. Pat. No. 4,970,723 to Lin. The Lin method improves upon this solution by allowing a single B-channel to support two audio devices. Thus, if a data device and a voice device are active simultaneously and a second audio device desires to commence operation or is being called, the B-channel of the previously active audio device is shared. The sharing of the B-channel requires a code converter at the central office switch of the public network and requires a code converter for each audio device. The code converters convert 8-bit voice sample code into 4-bit voice sample code. The conversion enables the bitstreams of the two audio devices to be merged for transmission through one B-channel of the BRI. When the two audio devices are operated simultaneously, each audio device positions 4-bit coded voice samples in a different sub B-channel of the single B-channel. Received 4-bit coded voice samples from the sub B-channels are converted to voice samples at the audio devices, while transmitted 4-bit coded voice samples are converted to 8-bit coded voice samples at the central office switch.

While the Lin method increases the number of devices that can be supported by a single ISDN line, the implementation of the method requires numerous code converters, including one that must be installed at the central office switch of the public network. Consequently, the method may be cost-prohibitive and is not available without the cooperation of the central office. Moreover, a data device that is connected to the network described in Lin is limited in bandwidth, since it can use only a single B-channel to exchange data transmissions.

An integrated system that allows audio communication simultaneously with digital data exchanges is described in U.S. Pat. No. 5,036,513 to Greenblatt. Two appropriately equipped telephones having cooperative digital signal processing and visual display equipment may use an ISDN line to exchange voice communication and user-transparent digital data. Thus, the system may be utilized only if the audio and data devices at both ends of a call are compatible. Additionally, the system is limited to exchanges between two sites, so that a caller cannot establish a call to one location while exchanging data with another location.

Outside of the ISDN environment, methods and systems for allowing simultaneous audio and voice transmissions are known. For example, U.S. Pat. Nos. 5,581,560 to Shimada et al. and 5,475,691 to Chapman et al. describe the use of a modem that connects both an audio device and a data device to a public switched telephone network (PSTN). As described by Chapman et al., when a simultaneous voice and data (SVD) modem determines that only the data device is attempting transmissions via an analog line of the PSTN, a data signal is formed at the modem, with the data signal being a stream of data symbols having a first symbol density. However, when the SVD modem detects that the audio device, e.g. a telephone, has gone "off-hook," the modem selects a lower symbol density for the data transmission. The resulting fewer bits per symbol accommodates a higher quality voice communication than would be available if the data transmission remained at the original symbol density. When the SVD modem determines that the telephone has gone "on-hook," the data transmission returns to its original higher symbol density. The Chapman et al. invention operates well within its analog environment to receive both audio signals from the telephone and data signals from the data device and to combine the signals for transmission along an analog line. However, the operations of the modem are less compatible with the high bandwidth, multi-channel communications in a digital environment.

What is needed is a method and apparatus that enable a full-function digital audio device, such as an ISDN telephone, with independent audio transmissions and data transmissions via a common digital communications line, and without affecting data transmission throughput when the audio device is idle.

SUMMARY OF THE INVENTION

A method and apparatus for utilizing a multi-channel digital communications line for supporting an audio device and a data device include a static allocation of a signaling channel for continuous and mutual utilization by the two devices, and include a dynamic allocation of at least two user data channels for independent but sometimes concurrent utilization by the two devices. In the preferred embodiment, the data device is a computer and is designated as the dominant device. The user data channels are dedicated to supporting data transfers to and from the data device when the audio device is idle. However, the data device continuously monitors the signaling channel to detect an event in which desired audio device access to the communications line is indicated. The indication of desired access may be a signal indicative of an attempted outgoing call by the audio device or may be a signal indicative of an incoming call to the audio device. In response, the data device surrenders one of the user data channels. The call to the audio device is supported using the surrendered user data channel, until the channel is released at completion of the call. The released user data channel is then reallocated to the data device.

In the preferred embodiment, the communications line is an ISDN basic rate interface link. Thus, the signaling channel is a D-channel and the user data channels are two B-channels. The data device and the audio device access the communications line "independently," which is defined herein as access to the dynamically allocated bandwidth without direct exchanges of signals between the two devices. Still referring to the preferred embodiment, the dynamic allocation of bandwidth is responsive to detecting D-channel exchanges between the audio device and the network, rather than signal exchanges between the two devices. For example, the detected signals may be SETUP-related messages on the D-channel. For an outgoing voice call, the data device may surrender one of the B-channels upon detecting a return message that is responsive to a SETUP message from the audio device. The return message may be a RELEASE COMPLETE, with an identified cause of "no channel available." The data device surrenders the B-channel upon detecting this SETUP-related message, and the audio device automatically and successfully attempts the same call. For an incoming call, a SETUP message is received from the central office switch, indicating a voice call. In response, if the data device is occupying both B-channels, one channel will be surrendered, so that the connection with the incoming call may be completed. Typically, a slight delay is imposed by the audio device to allow adequate time for the data device to surrender the channel for instances in which a user answers the audio device upon a first indication of an incoming call.

Although the audio device and the data device are connected to independently access the communications line, separate connections into network termination equipment are not critical. One device may be connected to a port of the other device. However, the physical connection should allow both devices to continuously monitor the signaling channel. In the ISDN environment, both the audio device and the data device may be connected to the S-bus or one device may be on the U-bus with the appropriate SO interface or adaptor to the other device, allowing each device to "view" the transactions of the other device.

In one embodiment, the dynamic bandwidth allocation occurs at an external or internal terminal adaptor of the data device, such as a computer. The terminal adaptor includes a bandwidth allocator having a first mode in which the user data channels of the communications line are dedicated to supporting data transfers for the data device. The bandwidth allocator also includes a second mode in which one of the user data channels is surrendered in order to permit access to the communications line by the audio device. The terminal adaptor has a monitor that is connected to the signaling channel of the communications line to detect first signals indicative of desired access to the communications line by the audio device and to detect second signals indicative of termination of such access. When the monitor detects the access-desired first signal, the bandwidth allocator is switched from the first mode to the second mode. On the other hand, when the monitor detects the access-termination second signal, the bandwidth allocator is switched back to the first mode.

An advantage of the invention is that direct communication between the audio device and the data device is not required. Consequently, the method and apparatus can be implemented without requiring large-scale changes to standard audio and data devices. Conventionally, messages from a central office of a network to devices supported on the BRI are directed to the specific device using an addressing mechanism called a Terminal EndPoint Identifier (TEI). A particular device normally reacts only to messages bearing the TEI of the particular device, ignoring messages directed to other devices. Thus, the monitoring step of the invention requires only that at least the data device monitor and react to messages having a TEI other than its own. However, the preferred embodiment is one in which both the audio device and the data device monitor and react to certain messages having TEIs of the other device.

Another advantage of the invention is that the data device is able to utilize the full capacity of the multi-channel communications line, e.g. an ISDN link, during periods in which the audio device is idle, but the connectivity is automatically adapted to accommodate desired access to the communications line by the audio device.

DETAILED DESCRIPTION

Figure 1:
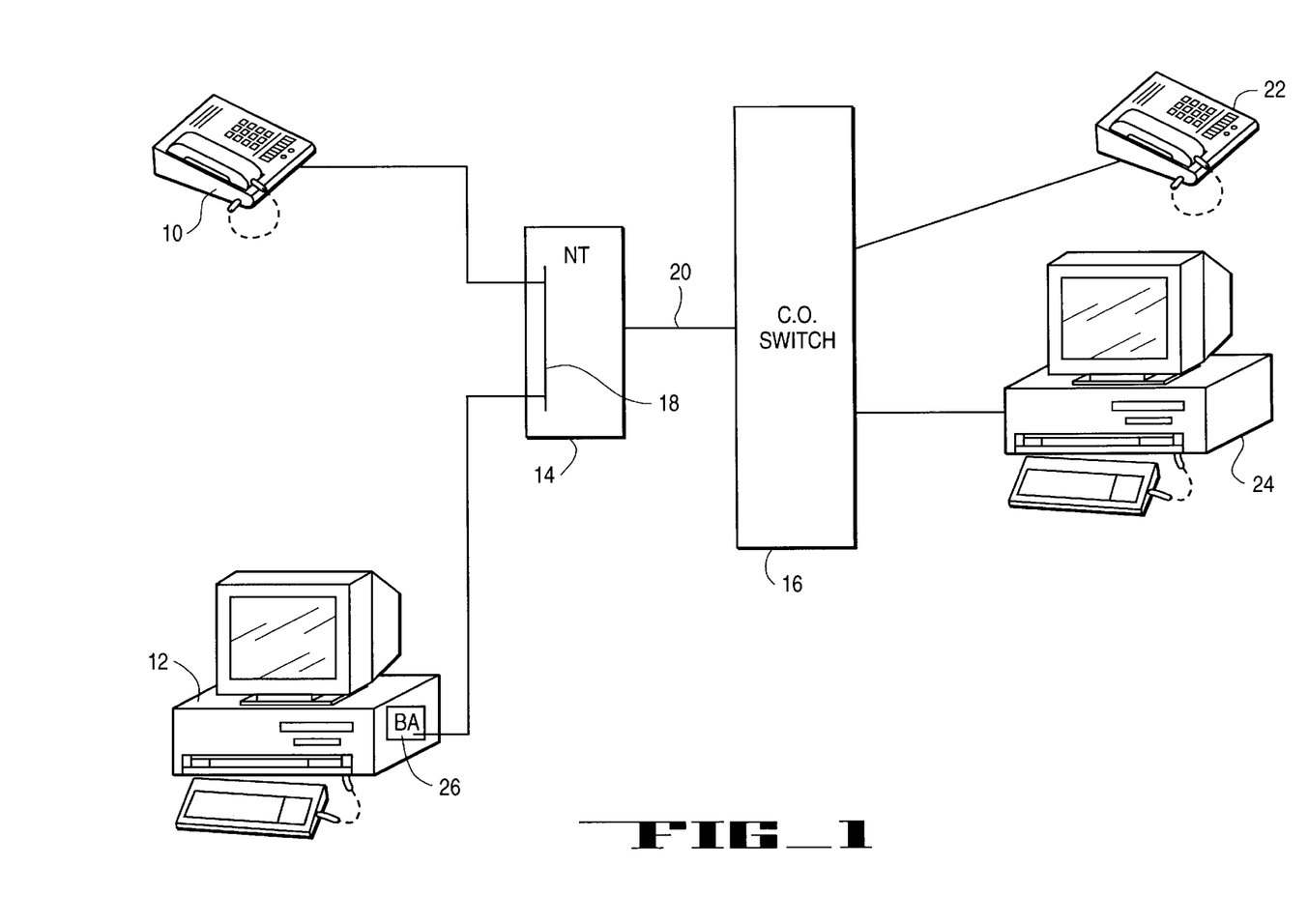
FIG. 1 is a block diagram of a network for implementing dynamic bandwidth allocation in accordance with the invention.

With reference to FIG. 1, an audio device 10 and a data device 12 are shown as being connected to network termination equipment 14 for supporting multi-channel digital communications. In the preferred embodiment, the network termination equipment is ISDN equipment that links the devices 10 and 12 to a central office 16 of an ISDN network.

The audio device 10 and the data device 12 are independently connected to a common bus 18. For a BRI, the common bus may be the S-bus. An SO interface is a standard ISDN bus that supports up to eight devices on a BRI. Any ISDN device that has an SO interface can connect to the bus 18. However, direct communication among the connected devices is not possible. Due to the nature of the bus, devices are able to receive messages from the network 16, but do not detect messages from other devices that are directed from other devices towards the network. Nevertheless, the protocol to be described below utilizes the one-way messaging to allow each device to monitor the activity of the other device or devices. While only two devices are shown as being connected to the common bus 18, other devices may be connected prior to implementation of the protocol. Moreover, one of the devices may be on an S-bus "behind" a U-device, such as a 2B1Q device with a built-in network terminator having an SO interface or adaptor to support the device on the S-bus.

The audio device 10 is illustrated as being a telephone. In the preferred embodiment, the audio device is an ISDN phone. The data device is shown as being a computer, but other devices that transmit and/or receive digital information may be utilized without diverting from the invention.

According to the protocol, both the telephone 10 and the data device 12 on the common bus 18 monitor the signaling channel of the multi-channel digital communications line 20 from the central office switch 16 of the network. At least the data device 12 utilizes the signaling messages to track the activity of the other device or devices on the common bus. Messages from the central office 16 to the devices 10 and 12 on the BRI employ the addressing mechanism Terminal EndPoint Identifier (TEI) to identify an intended device. The data device continuously monitors the signaling channel and examines messages regardless of the TEI. Based upon the message content and the TEI, the data device is able to track the activities of the other device or devices.

As an example, if the data device 12 detects a SETUP message from the central office 16 on the D-channel of an ISDN line, it can be assumed that a remote audio device 22 is attempting an incoming call to the telephone 10. If data transmissions to the data device are occupying both B-channels, the data device may surrender one of the B-channels. The incoming call can then be connected via the surrendered B-channel. For an outgoing call, the SETUP message will be directed to the central office 16, so that it will not be detected by the data device. However, the central office switch will send a return signal that will be detected and examined by the data device. For example, the central office switch may send a RELEASE COMPLETE with a cause "no channel available" to reject the call attempt. In response to this RESET-related message, the data device will surrender one of the B-channels, if the data device is active. The audio device 10 may be programmed to reattempt the call after a fixed delay (e.g., 500 msec). Alternatively, the telephone may monitor the D-channel to detect a RELease message from the central office switch when the D-channel is released. Upon detecting the RELease message, the telephone can reissue the SETUP message for the outgoing voice call. Regardless of the embodiment, the reattempt to establish the outgoing call is preferably transparent to the caller.

As is well known in the field, ISDN is a medium and protocol that operates well for data applications, since both B-channels may be employed simultaneously. According to the invention, the data device is the primary user of the B-channel resources, and will therefore seize one or both of the B-channels as necessary to maintain maximum data throughput. In FIG. 1, a data transfer between the local data device 12 and a remote data device 24 may occupy both B-channels when the telephone 10 is idle. However, when an incoming or outgoing call is detected, a bandwidth allocator 26 at the local data device switches from a first mode in which both B-channels are utilized to a second mode in which one of the B-channels has been surrendered. The bandwidth allocation may be implemented in hardware or software.

Figure 2:
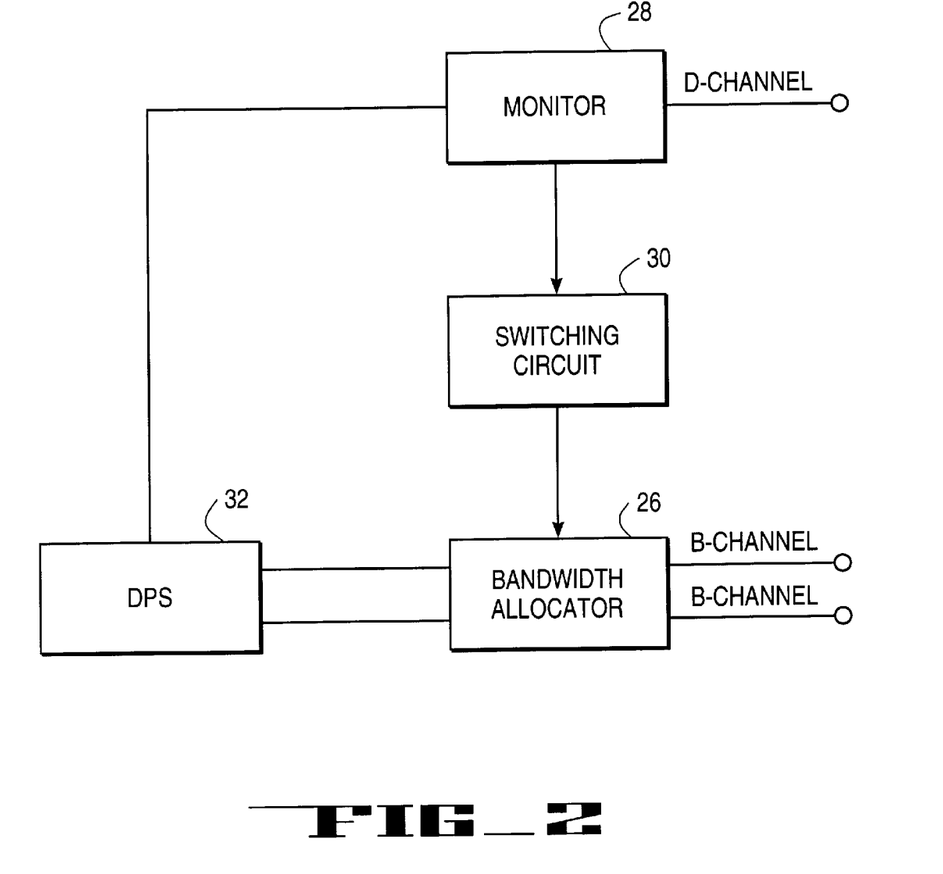
FIG. 2 is a block diagram of components of the data device of FIG. 1.

Referring now to FIG. 2, components of the data device are shown in simplified form. The D-channel of the ISDN line is connected to a monitor 28, while the two B-channels are connected to the bandwidth allocator 26. As previously noted, the D-channel is continuously monitored to determine the status of the audio device, as well as to process messages intended for the data device. A switching circuit 30 is responsive to the monitor. The switching circuit selectively switches the bandwidth allocator from the first mode to the second mode when access to the ISDN line is desired by the audio device. Consequently, the switching circuit triggers a return to the first mode when the monitor 28 detects a D-channel signal indicative of termination of activity by the audio device. While the switching circuit 30 is identified as a "circuit," the switching may be implemented in computer software.

The data device also includes a digital processing system (DPS) 32. The DPS operates in a conventional manner for the type of data device utilized in implementing the invention. That is, the specific operations of the DPS are not critical to the invention.

The bandwidth allocator 26, the monitor 28, and the switching device 30 may not be housed within the data device. Optionally, the three components are within a Terminal Adaptor (TA) that is external to the data device. The TA may be a stand-alone structure or may be contained within the network termination equipment 14 of FIG. 1. The three components provide dynamic bandwidth allocation of user data channels on an as-needed basis during a data transfer connection. In one embodiment, the dynamic bandwidth allocation is achieved using pseudo-code.

Figure 3:
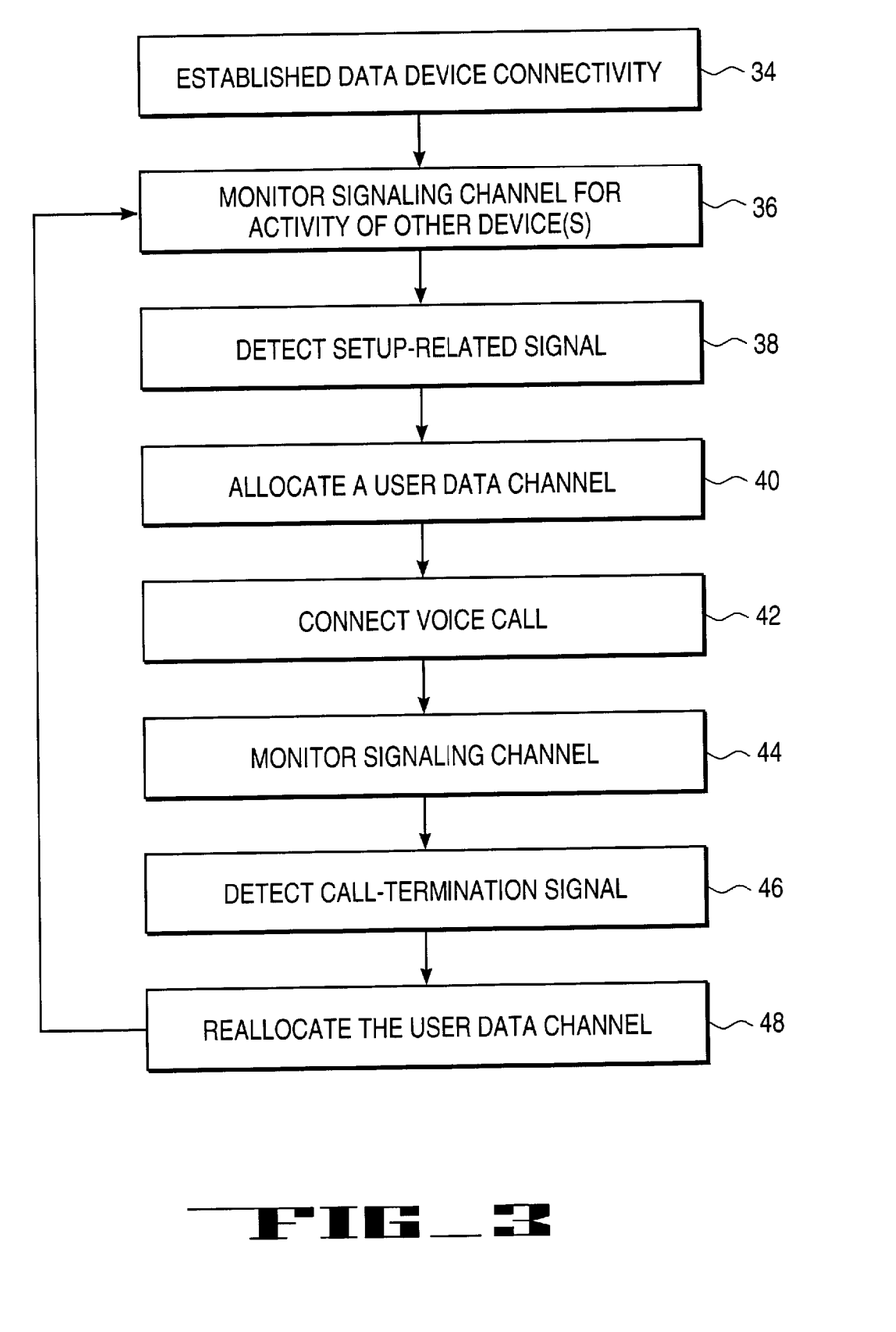
FIG. 3 is a process flow for implementing the dynamic bandwidth allocation in the network of FIG. 1.

FIG. 3 illustrates the process flow for the method described above. In step 34, the connectivity between two data devices is established. For example, in FIG. 1, the local data device 12 may be connected to the remote data device 24 to accommodate data transfers between the two devices. As previously noted, typically both of the B-channels of a BRI are occupied during the data transfer.

In step 36, the signaling channel of the communications line is continuously monitored to track activity of the other devices that are connected to the common bus. In FIG. 1, the data device 12 monitors the D-channel in order to make assumptions regarding the state of the audio device 10. Preferably, the audio device is simultaneously monitoring the D-channel in order to determine the state of the data device.

When the data device detects a SETUP-related signal at step 38, a step 40 of allocating one of the user data channels to allow audio device access is implemented. In the ISDN environment, the data device releases one of the B-channels. The voice call can then be connected, as shown at step 42.

Figure 4:
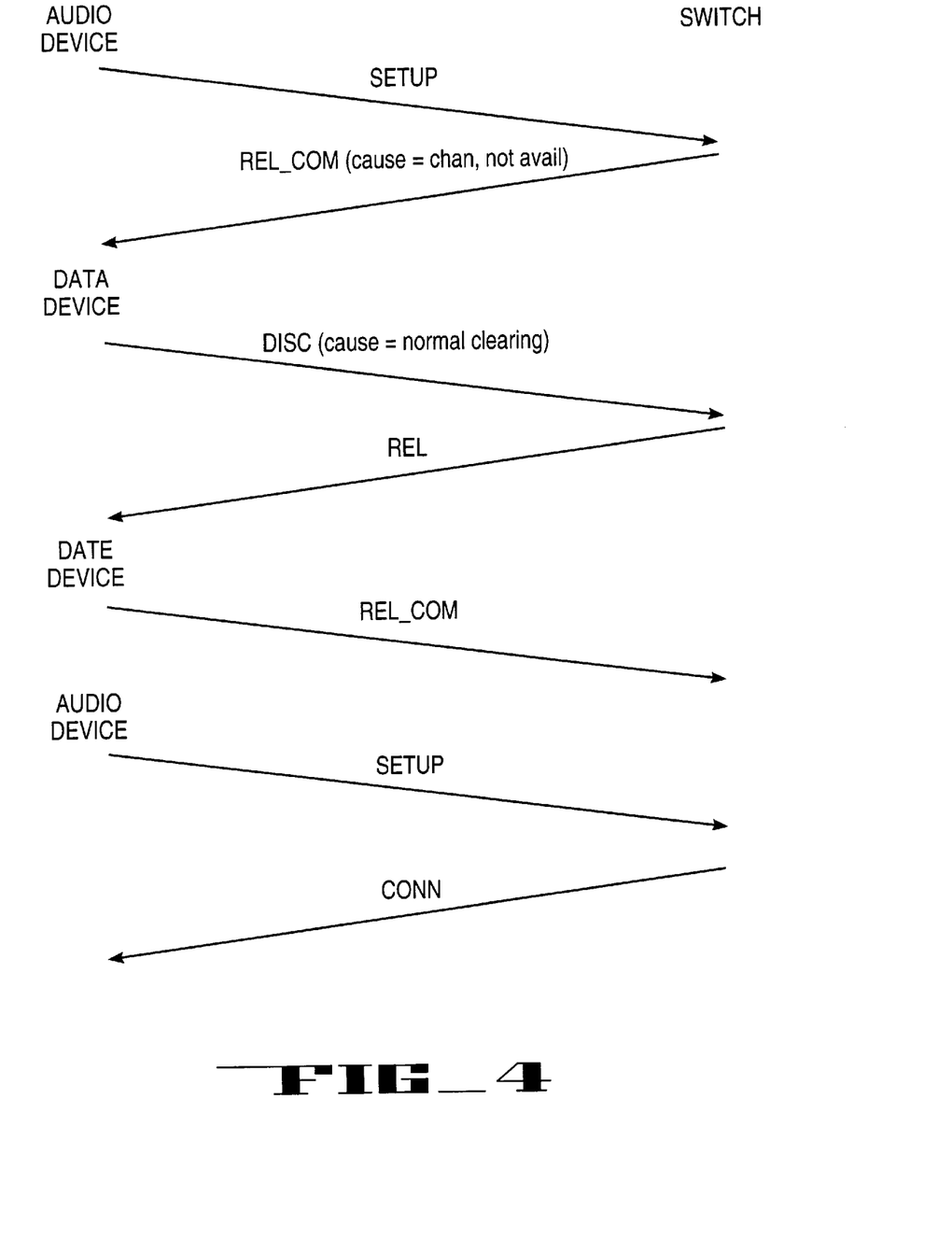
FIG. 4 is an illustration of a message flow within a signaling channel as a result of the detection of an outgoing voice call in implementing the process flow of FIG. 3.

FIG. 4 identifies a simplified D-channel Layer 3 message flow that may be utilized in executing steps 38, 40 and 42 in FIG. 3. When both channels of the BRI are occupied by the data device, a SETUP message sent by the audio device will result in the central office switch sending a return signal of RELease COMplete, with a cause of "channel not available." The data device will detect this SETUP-related return signal from the central office switch and will surrender a B-channel by sending a DISConnect signal to the switch. The switch returns a RELease signal and the data device responds with a RELease COMplete signal. The audio device then reattempts the call by transmitting the SETUP signal. The switch then transmits the normal CONNect signal.

The second attempt at sending the SETUP signal by the audio device may be time triggered. For example, the phone may wait a period of 500 msec after receiving the RELease COMplete, channel not available, as a response to the initial SETUP signal. Alternatively, the second attempt at SETUP may be a response to the RELease signal received from the switch as a return signal to the DISConnect signal from the data device.

Figure 5:
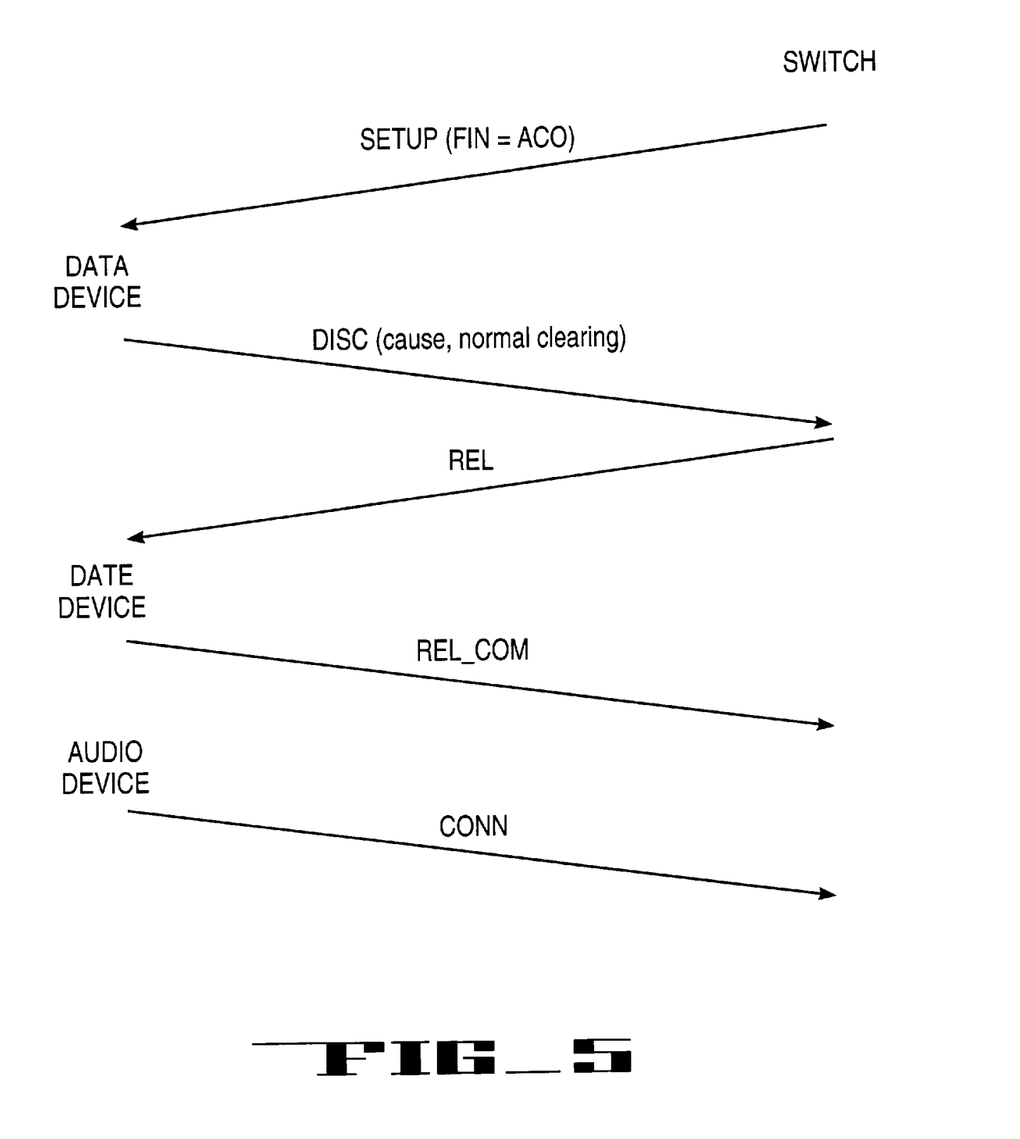
FIG. 5 is an illustration of a message flow for an incoming call during implementation of the method of FIG. 3.

The D-channel signal exchanges of FIG. 4 may occur when the local audio device 10 of FIG. 1 attempts to make a call to the remote audio device 22. FIG. 5 is an exemplary signal exchange for an incoming call. The central office switch 16 transmits a D-channel SETUP message to the common bus 18 despite the unavailability of either B-channel. This is typical in ISDN signaling. Additional call offering (ACO) is a service that allows an ISDN-BRI telephone to receive incoming calls even when both B-channels are busy. Call appearance call handling, electronic key telephone service (CACH EKTS) allows multiple calls to a telephone that supports lights and buttons for identifying the status of more than one call. Upon detecting the SETUP signal, the data device transmits a DISConnect signal to release one of the B-channels. The standard RELease and RELease COMplete signals are exchanged between the data device and the switch. The audio device then transmits the standard CONNect signal for answering the incoming call. One concern with this method is that there may be an inherent inefficiency with respect to the bandwidth for the data device. Since each member of a CACH EKTS group receives incoming SETUP messages for all of the incoming calls to all of the members of the group, an unnecessary amount of bandwidth narrowing will occur for a data device that releases a B-channel for each received SETUP message lacking a B-channel assignment. An alternative method that would overcome this concern would be one in which the data device is programmed to respond to a KEY HOLD message with any of the CAUSE codes indicating the unavailability of a B-channel. The data device can at that point transmit a DISCONNECT signal to release one of the B-channels. Such a method would avoid the narrowing of the data device bandwidth for voice calls that are not answered by the audio device. A concern with both of these methods is that for ACO calls, the data device must distinguish between SETUP messages for ACO and for CACH EKTS. In an ISDN environment, the ACO call may contain a SIGNAL element that indicates Additional Call Tone to distinguish the ACO call.

Under other scenarios, different signal exchanges will occur. For an incoming or outgoing voice call that is initiated when one or both of the B-channels are available, the D-channel message flow will be identical to the message flow that occurs when no dynamic bandwidth allocation is available. However, the data device should monitor the connectivity process, so that it is aware that only one B-channel is available. In another scenario, both the audio device 10 and the data device 12 are active, so that both B-channels are occupied. If a second data call is presented, the call will be rejected. On the other hand, if a second voice call is presented, the audio device is responsible for handling the voice call. The execution of this handling will depend upon the availability and configuration of services such as ACO and CACH EKTS.

In yet another scenario, both the audio device 10 and the data device 12 are active, but the voice call to the audio device is placed on "hold." While not critical to the invention, the throughput for the data transfers between the local and remote data devices 12 and 24 may be maximized by dynamically reallocating bandwidth to allow the data transfer to occupy both channels while the call is on "hold." The bandwidth allocator 26 of FIG. 1 continues to monitor the D-channel. When a RETRIEVE signal is detected, the bandwidth allocator assumes that the call is being taken off "hold" and surrenders one of the B-channels.

Returning to FIG. 3, the dynamic allocation of bandwidth occurs at step 40 and the connection of the voice call via the surrendered B-channel occurs at step 42. The data device continues to monitor the signaling channel, as shown at step 44. The monitoring step is identical to that of step 36, but the D-channel signal of greatest concern is the call-termination signal which indicates that the data device is free to recapture the previously surrendered B-channel. If at step 46 it is determined that the audio device has released the B-channel, a reallocation of bandwidth is implemented at step 48. That is, the B-channel is again assigned to the data device. The process then returns to step 36, allowing the data device to detect events in which the B-channel is to be released to allow a second voice call to be connected.

While the invention has been described and illustrated as being connected to an ISDN-BRI link, this is not critical. The invention may be used with other multi-channel communications lines that allow signal monitoring in the manner previously described.

We claim:

1. A method of dynamically allocating bandwidth of a digital communications line having a signaling channel and at least two user data channels comprising steps of:

connecting a data device to said communications line for communication with a network;

connecting an audio device to said communications line for communication with said network such that said data and audio devices access said communications line independently;

dedicating said bandwidth of said user data channels to supporting data transfers for said data device when said audio device is idle;

monitoring incoming communications received from said network via said signaling channel to detect a first event in which desired audio device access to said communications line is indicated, including utilizing said incoming communications received from said network to determine that said audio device previously transmitted a signal requesting said audio device access, thereby indirectly monitoring activity by said audio device;

surrendering one of said user data channels dedicated to supporting said data transfers for said data device in response to detecting said first event, while at least one user data channel remains dedicated to said data transfers;

supporting said audio device utilizing said surrendered user data channel;

monitoring said incoming communications received along said signaling channel to detect a second event in which said audio device releases said user data channel; and reallocating said surrendered user data channel to support said data transfers.

2. The method of claim 1 wherein said step of connecting said audio device includes linking a digital telephone to an ISDN line having two B-channels and a D-channel.

3. The method of claim 2 wherein said step of connecting said data device includes linking a computer having capability of implementing said steps of monitoring said signaling channel.

4. The method of claim 1 wherein said step of monitoring incoming communications received along said signaling channel to detect said first event is a step of monitoring a D-channel of an ISDN line for a return signal that is responsive to a SETUP signal previously transmitted by operation of said audio device, wherein said return signal is indicative of an unavailability of said communication line for an outgoing voice call from said audio device.

5. The method of claim 4 further comprising a step of initiating a voice call utilizing said surrendered user data channel following an imposed delay that is introduced upon detection of said return signal by said audio device, said imposed delay being introduced to enable said user data channel to be surrendered.

6. The method of claim 1 wherein said steps of monitoring said incoming communications received along said signaling channel are implemented in the absence of signal exchanges between said data device and said audio device.

7. An apparatus for dynamically allocating bandwidth of a multi-channel digital communications line between an audio device and a data device, said communications line having a signaling channel and at least two user data channels comprising:

a bandwidth allocator having a first mode in which said user data channels are dedicated to supporting data transfers for said data device and having a second mode in which a first user data channel is surrendered while at least one second user data channel remains dedicated to supporting said data transfers;

a monitor connected to said signaling channel to detect first SETUP-related signals indicative of desired access to said communications line by said audio device and to detect second SETUP-related signals indicative of termination of access to said communications line by said audio device, said monitor being isolated from detecting signals generated by said audio device; and switching means responsive to said monitor for switching said bandwidth allocator to said second mode when one of said first SETUP-related signals is detected and for switching said bandwidth allocator to said second mode when one of said second SETUP-related signals is detected.

8. The apparatus of claim 7 wherein said bandwidth allocator, monitor and switching means are components of a single terminal adapter that singularly supports communication of said data device with an external network.

9. The apparatus of claim 7 wherein said bandwidth allocator is connected to an ISDN line and said monitor is connected to a D-channel of said ISDN line.

10. The apparatus of claim 7 wherein said first SETUP-related signals include signals directed to said audio device to indicate unavailability of said first user data channel to accommodate outgoing calls for said audio device, each of said audio and data devices being digital devices.

11. A method of dynamically allocating bandwidth of an ISDN basic rate interface (BRI) link to independently connected telephonic and data devices comprising steps of:

continuously sharing a D-channel of said link between said telephonic and data devices such that each is enabled to exchange signals with an ISDN provider;

allocating first and second B-channels of said link to said data device as a default condition;

monitoring said D-channel to sense conditions in which an outgoing call from said telephonic device is initiated and in which an incoming call is directed to said telephonic device;

allocating said first B-channel to said telephonic device in response to sensing one of said conditions;

monitoring each incoming and outgoing call involving said telephonic device to detect time periods during which said incoming and outgoing calls are in on-hold conditions;

temporarily reallocating said first B-channel to said data device during said time periods in which said incoming and outgoing calls are in said on-hold condition, including returning allocation of said first B-channel to said telephonic device following each said on-hold condition; and reallocating said first B-channel to said data device following completion of each said incoming and outgoing call.

12. The method of claim 11 wherein said step of reallocating said first B-channel includes monitoring said D-channel to sense a signal indicative of said completion.

13. The method of claim 11 wherein said step of monitoring said D-channel includes sensing SETUP-related signals.

14. The method of claim 11 wherein said step of monitoring said D-channel is isolated to detecting signals from a central office of a telephone network.

15. The method of claim 14 wherein said step of monitoring said D-channel is implemented in the absence of exchanging signals between said telephone and data devices.

* * * * *